April 21, 1970 L. I. KNUDSON ET AL 3,508,095
PERMANENT MAGNET ALTERNATOR
Filed April 10, 1968 3 Sheets-Sheet 1
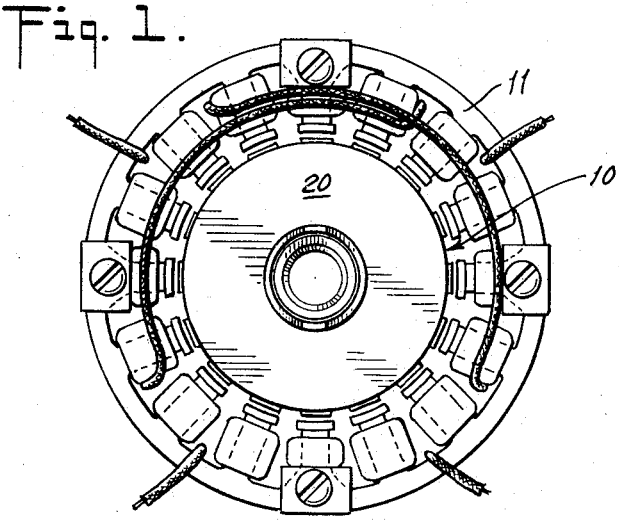
Fig. 1.
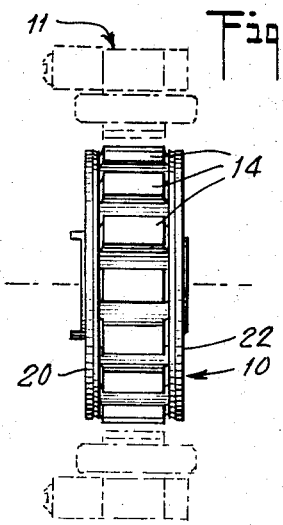
Fig. 2.
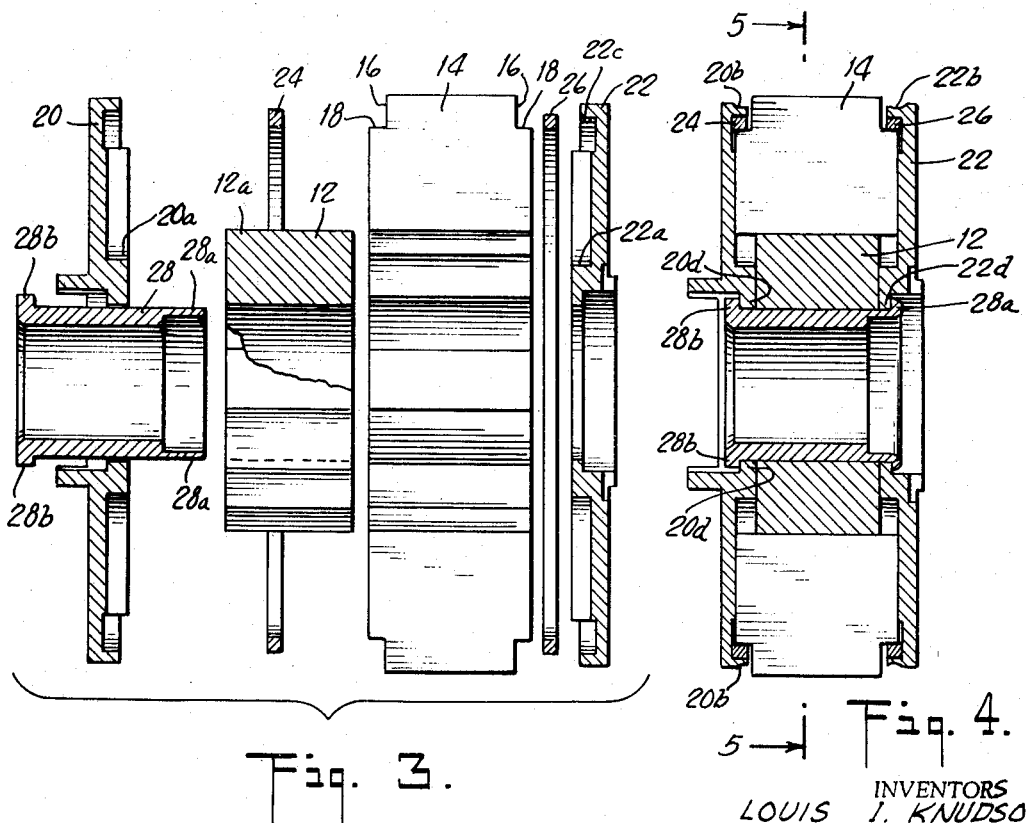
Fig. 3.
Fig. 4.
INVENTORS
LOUIS I. KNUDSON
RICHARD C. FRINK
BY Lester W Clark
ATTORNEY April 21, 1970    L. I. KNUDSON ET AL    3,508,095
PERMANENT MAGNET ALTERNATOR
Filed April 10, 1968    3 Sheets-Sheet 2
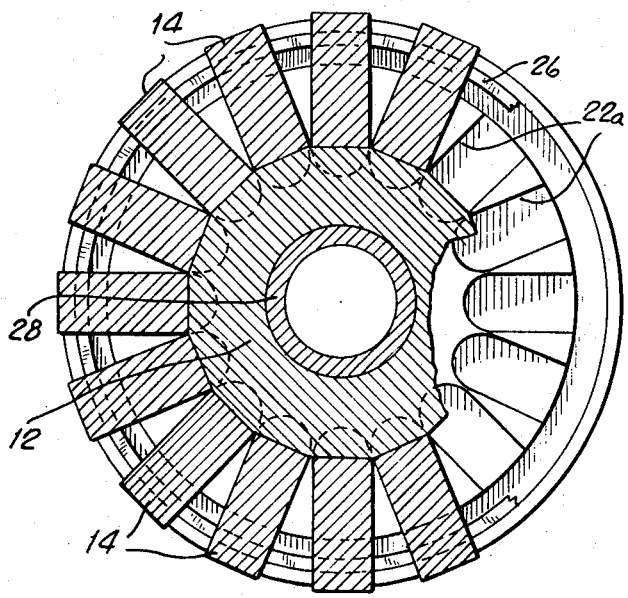
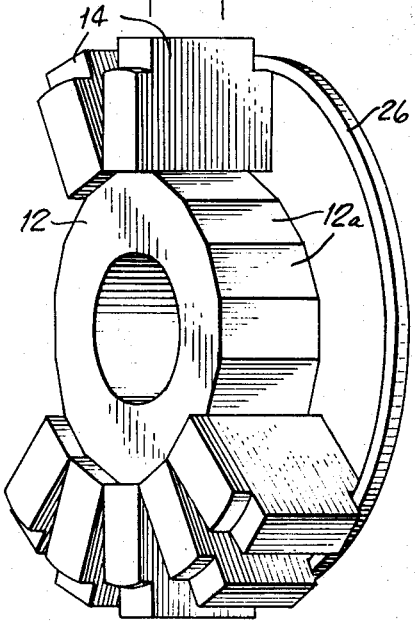
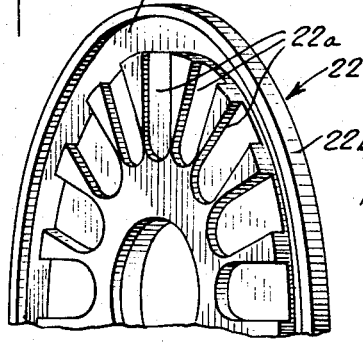
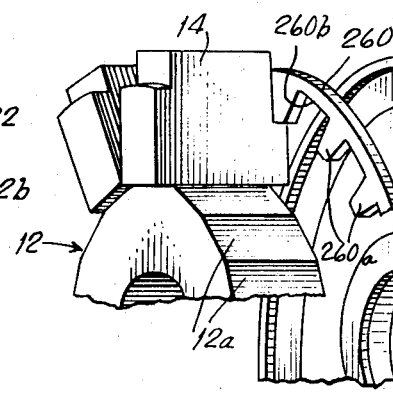
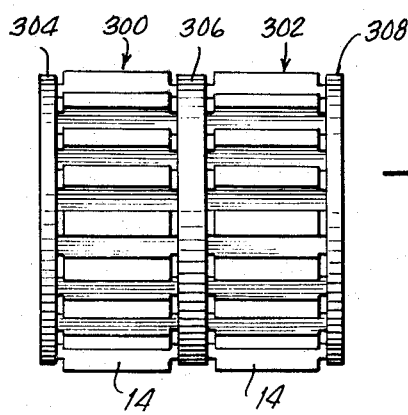
INVENTORS
LOUIS I. KNUDSON
RICHARD C. FRINK.
BY
ATTORNEY April 21, 1970  L. I. KNUDSON ET AL  3,508,095
PERMANENT MAGNET ALTERNATOR Filed April 10, 1968  3 Sheets-Sheet 3

INVENTORS
LOUIS I. KNUDSON
RICHARD C. FRINK
BY Lester W Clark
ATTORNEY

United States Patent Office 3,508,095
Patented Apr. 21, 1970

3,508,095
PERMANENT MAGNET ALTERNATOR
Louis I. Knudson and Richard C. Frink, Norwich, N.Y., assignors to General Laboratory Associates, Inc., Norwich, N.Y., a corporation of New York
Filed Apr. 10, 1968, Ser. No. 720,058
Int. Cl. H02k 21/12
U.S. Cl. 310—156    8 Claims

ABSTRACT OF THE DISCLOSURE

A dynamoelectric machine according to which permanent bar magnets of optimum magnetic properties are incorporated in a rotor for high speed applications. In order to retain the permanent magnet bars, which tend to be physically brittle, against movement at such high speeds the ends of the magnets are locked in by end plates forming part of the rotor.

BACKGROUND, OBJECTS AND SUMMARY OF THE INVENTION

This invention relates to a dynamoelectric machine, and more particularly, to a permanent magnet alternator whose rotor construction incorporates permanent magnet materials for providing the rotating field of the alternator.

It has become common to design alternators for use in various types of aircraft and such applications dictate that the alternator provide a weight advantage over the more conventional electromagnetic field types. In other words, it is extremely advantageous to have the highest possible ratio of power output to weight. Moreover, in such applications it is a requirement, in order to provide significant output power, that extremely high rotational speeds be obtainable; consequently, it becomes necessary to provide a structure capable of withstanding the high rotational speeds. A typical application of such a machine involves operation over a wide range of speeds and with upper values of rotational speeds of the order of 60,000 r.p.m. Eventual applications for such machines look to the possible ultimate attainment of speeds of 100,000 r.p.m.

It has long been recognized that with the availability of permanent magnet materials exhibiting large residual flux densities and coercive forces—and consequently, large energy products—there exists the possibility of exploiting these characteristics in the construction of a high speed rotor. However, a major difficulty has stood in the way of employment of such materials because those permanent magnet materials, with the highly desirable characteristics noted above, such as materials of the Alnico group, are physically brittle and do not lend themselves to being shaped or formed to obtain structural rigidity. Furthermore, if attempts are made to improve their tensile strength the materials lose their inherent high quality magnetic capabilities. Therefore, such materials have not been utilized before in high speed rotor constructions but have been confined to slow rotational speeds and relatively small structural diameters.

Accordingly, it is a primary object of the present invention to overcome the aforesaid difficulties which attend the use of permanent magnet materials in rotor constructions and to provide a rotor which is simple in construction, efficient and capable of operating at very high speeds.

Another object is to enable the utilization of permanent magnet materials which possess optimum magnetic properties but suffer from the defect of being physically brittle and which, therefore, must be carefully retained against undue radial or other movements when they are operating at high speeds.

Another object is to overcome the drawbacks present with permanent magnet materials and to enable the exploitation of these materials in permanent magnet alternators.

The present invention is based upon the recognition that the highly desirable permanent magnet materials can be utilized in a rotor by providing these materials in the form of magnet bars. Such magnets may be manufactured so as to obtain the maximum possible desirable magnetic properties since they may be heat treated with maximum magnetic orientation. In other words, the utilization of permanent magnet bars obviates the compromises which are imposed in the attempt to obtain optimum magnetic properties with structural rigidity. Thus, the permanent magnet bars do not have to be compromised magnetically to provide adequate tensile strength. The magnet bars can be left in their ordinary brittle state and yet they will be safely retained. as will be explained hereinafter, by the rotor construction of the present invention. Therefore, the present invention turns upon the fact that extremely brittle materials, very well suited to high speed permanent magnet rotors, can be effectively employed for this purpose and the drawbacks due to their brittleness can be overcome.

Accordingly, a broad feature of the present invention resides in the provision of a proper means for retaining the permanent magnet bars. It is arranged that the magnets are seated on the flats of a soft iron hub or core. End plates are provided forming part of the rotor assembly for locking the magnets in position. A washer between each of the end plates and the magnets acts as a tolerance absorber. Means are also provided which extend axially through the assembly for holding the parts of the rotor together. This means preferably takes the form of a hollow tube or sleeve which extends through the center of the assembly and, when spun over, retains the rotor integral so that it may be placed on a shaft.

The aforedescribed construction for the rotor thus enables retaining the permanent magnet bars and safeguarding these physically brittle magnets against possible damage due to the high speeds of rotor operation. Other benefits flow from the described rotor construction. A larger number of poles for a given diameter may be achieved and there can still be retained the maximum magnetic qualities of, for example, Alnico material. This permits a greater choice of frequency for alternator operation. A further advantage resides in the fact that the assembled rotor may be magnetized by a realizable fixture. In other words, because of the magnet bar construction the permanent magnet material may be permanently magnetized after assembly in a very simple and easy manner. Also, as noted previously, very high speed operation is possible without endangering the magnets. As a consequence of the high speed operation that can be realized, the machine can readily assume a design that will produce constant current into a resistance load, the load voltage, therefore, remaining constant as a function of speed. The constant current aspect of such a design can be appreciated from the following derivation:

N=rotational speed, r.p.m.
$\vec{E}_g$=alternator voltage (vector)=$\vec{K}_1 N$
$R_g$=alternator resistance, ohms
$X_g$=alternator reactance, ohms=$K_2 N$
$R_1$=load resistance, ohms
I=current
$K_1$=machine constant
$K_2$=machine constant $$\vec{E}_g = \vec{I}[R_g + R_1 + jX_g]$$
$$\vec{K}_1 N = \vec{I}[R_g + R_1 + jK_2 N]$$
$$\vec{I} = \frac{\vec{K}_1 N}{R_g + R_1 + jK_2 N}$$
$$I = |I| = \frac{K_1 N}{\sqrt{(R_g+R_1)^2 + (K_2 N)^2}}$$

At speeds greater than 2500 r.p.m. $K_2 N \gg (R_g + R_1)$
Therefore $$I \cong \frac{K_1 N}{\sqrt{(K_2 N)^2}} = \frac{K_1}{K_2}$$

a constant for a given alternator design. The voltage across the load is:

$$E_1 = IR_1 = \frac{K_1}{K_2} R_1$$

a constant for a given load resistance for speeds greater than 2500 r.p.m.

An ancillary feature of the present invention resides in the provision of means for creating parasitic air gaps in the rotor construction. These parasitic air gaps act to reduce the demagnetization effects that occur due to short circuit currents. The parasitic air gaps are defined by magnetic stainless steel bars placed laterally of, and in contact with, the permanent magnet poles. The steel bars are welded in place to the end washers which serve to retain the permanent magnets against unwanted movement.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is an end view of a permanent magnet alternator embodying the features of the present invention.

FIG. 2 is an elevational side view of the rotor with the stator being shown by dotted lines.

FIG. 3 is an exploded sectional view of the various parts of the rotor in accordance with a first embodiment of the present invention.

FIG. 4 is a sectional view of the rotor showing the parts in assembled relationship.

FIG. 5 is a sectional view taken on the line 5—5 in FIG. 4.

FIG. 6 is a partial perspective view looking at one end of the rotor assembly.

FIG. 7 is a perspective view of the washer and end plate construction according to one embodiment of the present invention.

FIG. 8 is an exploded perspective view of parts of the rotor according to another embodiment, and particularly illustrating the modification in the washer and end plate construction.

FIG. 9 is a side view of a modification of the rotor construction, illustrating separated groups of magnets, each group spaced circumferentially around the axis of the rotor.

DESCRIPTION OF PREFERRED EMBODIMENTS

Figure 10:
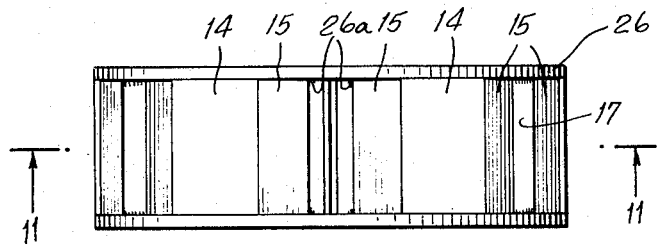
FIG. 10 is a top plan view of a rotor construction according to a further embodiment which features the addition of parasitic air gaps.

Referring now to the figures, a rotor 10 and a stator 11 are shown in operative spaced relationship in FIG. 1. For the sake of simplicity, the casing or housing usually provided is not illustrated, and it will be understood that the rotor 10 is normally mounted on a shaft for rotation in suitable bearings in such housing. The rotor 10 comprises a hub or core 12 around which are mounted a plurality of bars 14 of permanent magnet material. This permanent magnet material may, for example, be Alnico V, which has a composition of 8% aluminum, 14½% nickel, 24% cobalt, 3% copper and the balance, iron.

The core 12 is preferably constructed of magnetic ingot iron or similar material and is so formed as to be fitted over the sleeve 28 which in turn fits over the shaft (not illustrated). The outer peripheral surface 12a of the annular core 12 is made up of a plurality of flat, angularly related segments against which the bottom sides of the permanent magnet bars 14 are seated. The permanent magnet bars are restrained from circumferential movement because of the mounting of the bottom sides against the flat surfaces. The top sides of the permanent magnet bars 14 are alternately north and south poles respectively.

Although there are shown, for purposes of illustration, 16 permanent magnet bars in the circumferentially disposed series or group of such magnets, it will be understood that there may be any number of these bars depending upon the number of poles desired. It will be appreciated that the arrangement of 16 magnet bars corresponds to a 16 pole machine.

The plurality of permanent magnet bars 14 are secured to the rotatable core 12 by means of the retaining arrangement which constitutes the principal feature of the present invention. This feature enables tight clamping of the bars so as to restrain them against radial movement but without imposing undue strain upon them. This retaining means comprises the end plates 20 and 22 and the washers 24 and 26. Both the end plates and the washers are typically constituted of stainless steel or the like. The end plates 20 and 22 in the embodiment illustrated in FIGS. 3–7 have the central raised portions of their inner surfaces milled so as to provide a series of spaced, generally U-shaped, radially extending slots 20a and 22a respectively. Flanges 20b and 22b on the respective end plates define with the periphery of the central raised portion the circumferential channels 20c and 22c, respectively. These channels are designed to receive the washers 24 and 26. The outer peripheral surface of the washers is adapted to engage the flanges 20b and 22b. As will be seen, each of the ends 16 of the permanent magnet bars is provided with a shoulder 18. The inner peripheral surfaces of the washers abut these shoulders when the extreme ends of the bars are fitted within the slots 20a and 22a. As will be seen in FIG. 4, where the parts of the rotor have been assembled, the washers 24 and 26 fit tightly against the shoulders 18. When the flanges 20b and 22b are rolled over, the magnet bars 14 become rigidly retained within the slots 20a and 22a.

It will also be seen that when the parts of the rotor are brought together, the hollow tube 28 is passed through the center of the assembly and the end 28a is spun over against the flange 22d and plate 22. At the opposite end of the sleeve 28, the flange 28b engages the flange 20d on the plate 20. Thus, the rotor assembly is rigidly unified and made integral, so that it may be placed on its shaft as a unit.

Referring now to FIG. 8, there is shown a partial perspective view illustrating another embodiment of the retaining means in accordance with the present invention.

In this embodiment, rather than the milled slots 20 that were provided in the inner face of the end plates, the end plate 220 here shown is of simpler configuration and firm retention of the ends of the magnets is provided by dint of the configuration of the washer 260 which takes the place of the washer 26 in the first embodiment. The other parts, namely, the core 12 and the magnet bars 14, are identical with the previous embodiment.

The washer 260 illustrated in FIG. 8 is shaped to have a series of spaced teeth 260a defining notches 260b. The extremities of the magnet bars fit within the notches 260b and are retained thereby. Thus, the upper side of the notch 260b engages the shoulder at the end of the magnet bar.

FIG. 9 illustrates a modified construction for the rotor of the present invention. In this modification separate groups of circumferentially disposed magnet bars are provided. Thus, the groups 300 and 302 are spaced from each other along the axis of the rotor and three end plates, 304, 306 and 308 are provided. The common central plate 306 retains the inner ends of the magnets 14. The extreme end plates 304 and 308 retain the opposite ends of the respective groups of magnets. This arrangement permits much longer rotor assemblies to be achieved but with reasonable lengths for the individual permanent magnet bars.

After the rotor of the present invention has been assembled as described hereinabove, the rotor is magnetized, that is to say, the permanent magnet bars receive their charge. A typical way of doing this is to use a suitable magnetizing fixture, (not shown), made very much in the form of the stator 11 of the alternator of FIG. 1. In the case of a rotor of 16 pole construction the magnetizing fixture would have a winding assembly with the same number of teeth as there are poles on the rotor. The windings on each pole of the magnetizing fixture are identical as to number of turns and wire size but are connected in series in pairs such that in progressing around the teeth of the magnetizer there would be alternately a north pole and then a south pole, thereby corresponding with the alternate north-south pole configuration of the rotor.

Each pair of poles is connected to a separate bank of capacitors (not illustrated) which have enough capacitance to shape the current wave form to provide sufficient current in each of the windings for a long enough period to magnetize the particular magnets on the rotor. However, all of the capacitor banks, which number 8 in the case of a 16 pole rotor, are discharged at the same time. The current in the windings of the magnetizer is made unidirectional to prevent demagnetization effects. This unidirectional pulsing is obtained by discharging the aforesaid capacitor banks through a common ignitron.

The procedure for charging a rotor such as the rotor 10 illustrated, is as follows: the rotor is inserted in the magnetizing fixture and, since there has to be some clearance in order to insert the rotor, it is necessary to position the rotor such that one pair of the winding fixture poles are tight against a marked pair of the winding fixture teeth. The remaining poles of the rotor are opposite other teeth on the fixture but there will be an air gap between them. In operation all of the banks of capacitors are charged up to the desired voltage using a suitable power supply (not illustrated). The common ignitron is triggered such that all of the capacitor banks discharge through their respective windings on the magnetizing fixture. The rotor is then rotated such that the next pair of poles is tight against the marked pair of teeth and the procedure is repeated for each of the pairs of poles.

Figure 11:
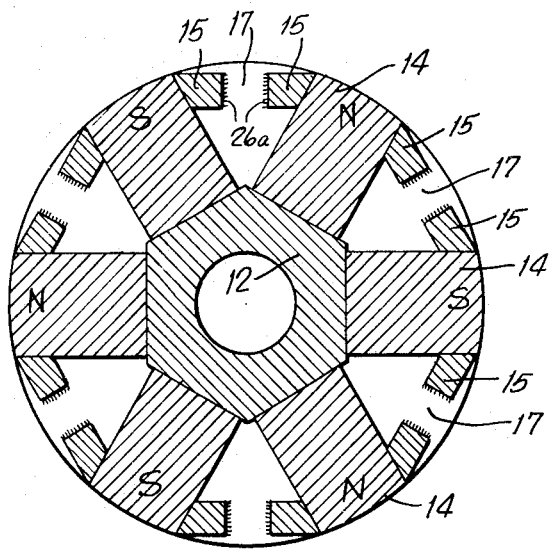
FIG. 11 is a sectional view taken on the line 11—11 in FIG. 10.

In the embodiments already described, the rotor has been constructed so as to be provided with 16 poles. It has been pointed out that varied numbers of poles can be selected and that the present invention is not limited to any particular number of poles for the rotor. However, in the event that the rotor is constructed with 12 or more poles there is no difficulty with short circuit currents. That is to say, the rotor is not easily demagnetized by short circuit currents because, in the case of 12 or more poles, parasitic air gaps are automatically provided by reason of the proximity of the poles. However, when fewer than 12 poles are utilized, for example, when a 6 pole rotor is constructed, it has been found that the rotor is rather easily demagnetized by short circuit currents. Accordingly, parasitic air gaps are created for the above-stated purpose in a 6 pole rotor construction as exemplified by FIGS. 10 and 11. In this embodiment, the usual arrangement of circumferentially spaced magnets 14 are provided and these are mounted on the flat surface segments of the hub 12. However, in this embodiment magnetic stainless steel bars 15 are placed laterally of, and in contact with, the permanent magnet poles. These bars 15 extend longitudinally in substantially the same manner as the permanent magnet poles 14; that is they extend in the direction of the rotational axis of the rotor. They are affixed by being welded in place at their ends to the washers 26 (at the weld points 26a). Pairs of bars 15, as they extend laterally, or circumferentially, from adjacent permanent magnet bars 14, define each of the required parasitic air gaps 17.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A rotor for a dynamoelectric machine, said rotor comprising an annular core of magnetizable material; permanent magnet means in the form of a plurality of independent magnet bars mounted on the outer periphery of said annular core; means for retaining said magnet bars, said retaining means comprising a plate and an annular washer at either of the ends of said magnet bars; and axially extending means for holding the rotor assembly together, comprising a hollow tube extending through the center of said annular core, said tube having a flange at either end, one of which is rolled over against said retaining means.

2. A rotor for a dynamoelectric machine, said rotor comprising an annular core of magnetizable material; permanent magnet means in the form of a plurality of independent magnet bars mounted on the outer periphery of said annular core; axially extending means for holding the rotor assembly together; and means for retaining said magnet bars, said retaining means comprising a plate and an annular washer at either of the ends of said magnet bars, each of said magnet bars being provided with a shoulder at either end; and corresponding slots in said retaining means for receiving the ends of said magnet bars.

3. A rotor for a dynamoelectric machine, said rotor comprising an annular core of magnetizable material; permanent magnet means in the form of a plurality of independent magnet bars mounted on the outer periphery of said annular core; axially extending means for holding the rotor assembly together; and means for retaining said magnet bars, said retaining means comprising a plate and an annular washer at either of the ends of said magnet bars, said plate having a circumferential channel at its periphery and said annular washer fitting within said channel.

4. Apparatus as defined in claim 2, wherein said plate has radially extending spaced slots for receiving the ends of said magnet bars.

5. Apparatus as defined in claim 2, wherein said washer has slots for positioning said magnet bars.

6. A rotor for a dynamoelectric machine, said rotor comprising an annular core of magnetizable material;

permanent magnet means in the form of a plurality of independent magnet bars mounted on the outer periphery of said annular core; axially extending means for holding the rotor assembly together; and means for retaining said magnet bars, said retaining means comprising a plate and an annular washer at either of the ends of said magnet bars, said means for retaining including axially inwardly directed flanges on said plates.

7. Apparatus as defined in claim 6, wherein said retaining means includes a washer clamped between the ends of the magnets and said flange.

8. A rotor for a dynamoelectric machine, said rotor comprising an annular core of magnetizable material; permanent magnet means in the form of a plurality of independent magnet bars mounted on the outer periphery of said annular core; axially extending means for holding the rotor assembly together; and means for retaining said magnet bars, said retaining means comprising a plate and an annular washer at either of the ends of said magnet bars; including at least two magnetic stainless steel bars placed laterally of, and in contact with, each of said permanent magnet bars, said steel bars being affixed to the annular washer at either of the ends of said permanent magnet bars, pairs of bars as they extend circumferentially from adjacent permanent magnet bars defining a parasitic air gap.

References Cited

UNITED STATES PATENTS

| | | | |
|---|---|---|---|
| 2,475,776 | 6/1949 | Brainard | 310—156 |
| 2,930,916 | 3/1960 | Scanlon | 310—156 |
| 3,219,861 | 11/1965 | Burr | 310—156 |
| 3,411,059 | 11/1968 | Kaiwa | 310—156 |

J D MILLER, Primary Examiner

R. SKUDY, Assistant Examiner

U.S. Cl. X.R.

310—261, 263